No. 846,403. PATENTED MAR. 5, 1907.
W. L. D'OLIER.
SINGLE SHAFT CENTRIFUGAL MACHINE.
APPLICATION FILED DEC. 7, 1904.
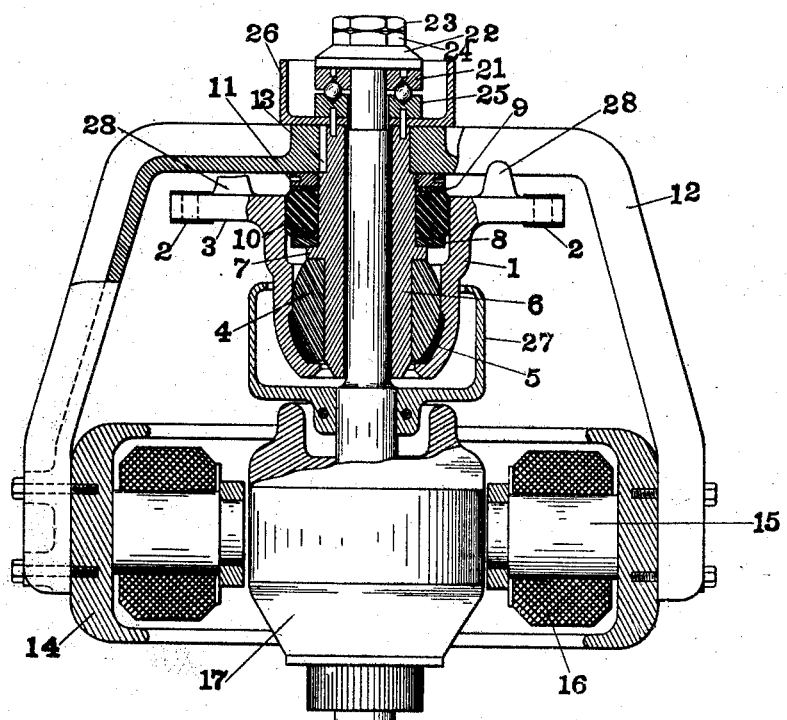
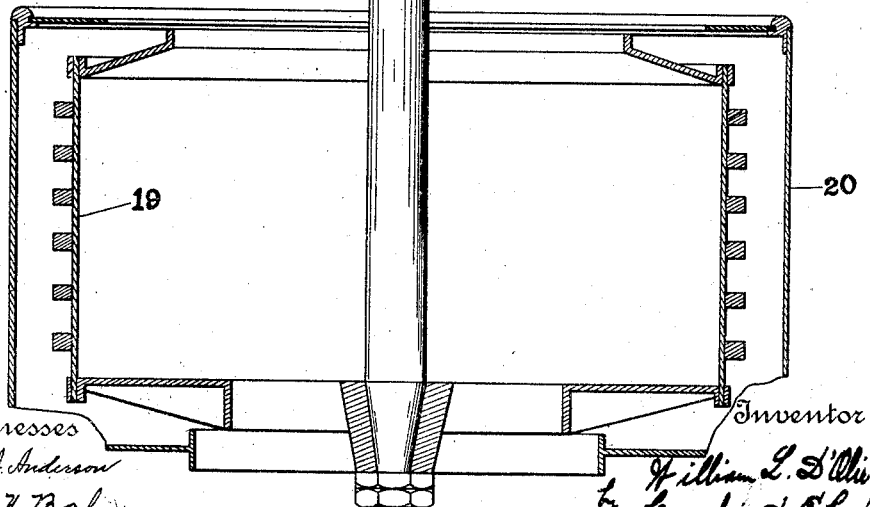
Witnesses
Bristow J. Anderson
Edith N. Bahn
Inventor
William L. D'Olier
by Cornelius D. Ehret
his Attorney

UNITED STATES PATENT OFFICE.

WILLIAM L. D'OLIER, OF PHILADELPHIA, PENNSYLVANIA.

SINGLE-SHAFT CENTRIFUGAL MACHINE.

No. 846,403.  Specification of Letters Patent.  Patented March 5, 1907.

Application filed December 7, 1904. Serial No. 235,807.

*To all whom it may concern:*

Be it known that I, WILLIAM L. D'OLIER, a citizen of the United States, residing at Philadelphia, in the county of Philadelphia and State of Pennsylvania, have invented certain new and useful Improvements in Single-Shaft Centrifugal Machines, of which the following is a specification.

My invention relates to centrifugal apparatus more especially adapted for treating sugar, salt, or, in fact, any materials which are to be dried, separated, or otherwise treated.

My invention resides in a motor-driven centrifugal in which a single spindle or shaft is employed, thus dispensing with the two-spindle or two-shaft arrangements heretofore employed.

My invention resides in a single-spindle or single-shaft motor drive for centrifugal baskets, the rotatable and non-rotatable motor elements being maintained concentric though the motor and basket are permitted to gyrate.

For an illustration of one of the forms my invention may take reference is to be had to the accompanying drawing, in which the figure is a vertical sectional view, some parts being shown in elevation.

Referring to said figure, 1 is a hanger which is adapted to be secured by bolts passing through the bolt-holes 2 in the flanges 3 to any suitable fixed support—as, for example, a mixer or bracket supported upon a mixer as commonly employed in sugar-refineries. Within the hanger is a ball member 4, which bears on the babbitt lining 5 within the hanger 1. The ball member 4, with 5, constitutes a universal bearing, a ball-and-socket bearing, permitting gyration hereinafter referred to.

6 is a tubular member or sleeve of mild steel or the like which fits at its lower portion within the ball 4, the ball 4 being loose upon said sleeve 6 or may be shrunken upon the sleeve 6, if desired, or otherwise secured thereto.

7 is a collar on the sleeve 6, which rests upon the upper surface of the ball 4. Resting upon the collar 7 is a washer 8, between which and the washer 9 is confined the rubber buffer 10.

The rubber buffer 10 is of a diameter equal to the internal diameter of the upper portion of the hanger 1 and its compression may be adjusted by the nut 11, which is screw-threaded upon the sleeve 6. The nut 11 is provided with holes in its circumference to admit a spanner-wrench or the like. Immediately above these screw-threads the sleeve 6 is of smaller diameter, and upon this portion of smaller diameter is fitted the bracket 12, secured to the sleeve 6 by the key 13. The bracket 12 supports the field or non-rotatable electric motor element 14, 15 representing a field-core carrying the usual winding 16. The armature 17 of the motor is secured in any well-known manner upon the vertical spindle or shaft 18, at whose lower extremity is secured the centrifugal basket 19, located within the usual curb 20. The shaft 18 extends upwardly through the sleeve 6, having a loose or a bearing fit therein.

21 is a bearing member secured to the member 22, which in turn is secured by the nuts 23 24 to the shaft 18. In other words, the bearing member 21 is secured to and rotates with the shaft 18. 25 is a second bearing member similar to 21, secured to the upper end of the sleeve 6. Balls, rollers, or other antifriction members are located between the bearing members 21 and 25 to form an antifriction-bearing between the rotating shaft 18 and the stationary sleeve member 6.

26 is a cup surrounding the ball or roller bearing and adapted to contain oil or the like, so that said bearing is always immersed in a bath of lubricating material. The cup 26 is secured to the sleeve 6.

27 is a cup secured to the shaft 18 immediately below the hanger and is adapted to catch all drippings of oil or the like which may pass through the hanger from the bearings.

From the foregoing description it is seen that the rotatable and non-rotatable motor elements are maintained concentric independently of the gyrations of the shaft 18, carrying the basket and armature. Such gyration takes place on the ball-and-socket bearing 4 5, the center of gyration being the center of the spherical surface of the ball 4. Lugs 28 upon the upper side of the flanges 3 of the hanger 1 serve to prevent the rotation of the bracket 12, and therefore serve to hold the sleeve 6 and the motor element 14 from rotating. By this arrangement a single shaft only—namely, 18—is necessary, thus dispensing with the hollow shaft embracing an internal non-rotatable shaft heretofore employed in centrifugal drives. The shaft 18 may be withdrawn either upwardly or downwardly through the hanger 1.

It is to be understood that the bracket 12 may, if desired, be attached to the sleeve 6 at a point below the hanger 1 and will in that event gyrate just as in the arrangement shown.

What I claim is—

1. In a single-shaft centrifugal drive, the combination of a hanger, a sleeve member having a gyration bearing in said hanger, a rotatable shaft extending through said sleeve member and having a bearing thereon, a bracket for supporting a motor element secured to said sleeve member, and a projection on said hanger adapted to engage said bracket to prevent its rotation.

2. In a single-shaft centrifugal drive, the combination of a hanger, a non-rotatable sleeve member extending above and having a gyration bearing in said hanger, a rotatable shaft having a bearing upon the top of said sleeve member, a bracket for supporting a motor element extending below said hanger, said bracket having an aperture to receive said sleeve member and secured thereto at the upper end thereof.

3. In a single-shaft centrifugal drive, the combination of a hanger, a sleeve member having a gyration bearing in said hanger, a rotatable shaft having a bearing upon the top of said sleeve member, a bracket for supporting a motor element secured to said sleeve member above said hanger and extending below said hanger, and a projection on said hanger adapted to engage said bracket to prevent its rotation.

4. In a single-shaft centrifugal drive, the combination of a hanger, a sleeve member having a gyration bearing in said hanger, a bracket secured to said sleeve member above said hanger and extending below said hanger, a projection on said hanger adapted to engage said bracket to prevent its rotation, a rotatable shaft extending through said sleeve member, and a bearing for said shaft on said sleeve member above said bracket.

5. In a single-shaft centrifugal drive, the combination of a hanger, a sleeve member extending above and having a gyration bearing in said hanger, a bracket secured to said sleeve member above said hanger and extending below said hanger, a resilient member surrounding said sleeve member beneath said bracket and confined between said sleeve member and said hanger, and a rotatable shaft extending through said sleeve member and having a bearing thereon above said bracket.

6. In a single-shaft centrifugal drive, the combination of a hanger, a ball member having a gyration bearing in said hanger, a non-rotatable sleeve member independent of said ball member extending through said ball member and resting thereon, a rotatable shaft having a bearing upon said sleeve member, and a bracket for supporting a motor element secured to said sleeve member above said hanger and extending below said hanger.

7. In combination, a hanger, a non-rotatable sleeve member having a gyration bearing in said hanger, a rotatable shaft having a bearing upon the top of said sleeve member, an element of a driving-motor secured upon said shaft to drive the same, a complementary motor element, a bracket for supporting said complementary motor element in operative position extending from below said hanger over said hanger and operating as a unit with said sleeve member to gyrate therewith.

8. In a single-shaft centrifugal drive, the combination of a vertically-disposed hanger, a ball member having a gyration bearing in said hanger, a non-rotatable sleeve member extending loosely through said ball member and resting thereon, resilient means confined between said sleeve member and hanger and a vertical rotatable shaft having a bearing upon the end of said sleeve member.

WILLIAM L. D'OLIER.

Witnesses:
EDITH N. BAHN,
JOHN CONNELL.